(12) United States Patent
Kang et al.

(10) Patent No.: US 8,885,695 B1
(45) Date of Patent: Nov. 11, 2014

(54) RECEIVER CIRCUIT

(71) Applicants: Global Unichip Corporation, Hsinchu (TW); Taiwan Semiconductor Manufacturing Co., Ltd., Hsin-Chu (TW)

(72) Inventors: Wen-Juh Kang, Tainan (TW); Ming-Hsien Tsai, Kaohsiung (TW); Jung-Chi Huang, Hsinchu County (TW)

(73) Assignees: Global Unichip Corporation, Hsinchu (TW); Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/927,203

(22) Filed: Jun. 26, 2013

(51) Int. Cl.
  *H04B 3/46* (2006.01)
  *H04B 17/00* (2006.01)
  *H04Q 1/20* (2006.01)
  *H04L 1/20* (2006.01)
  *H04L 25/03* (2006.01)

(52) U.S. Cl.
  CPC .......... *H04L 1/203* (2013.01); *H04L 25/03057* (2013.01)
  USPC ............ 375/227; 375/229; 375/232; 375/233

(58) Field of Classification Search
  USPC ......................................... 375/229–236, 227
  See application file for complete search history.

(56) References Cited

U.S. PATENT DOCUMENTS

| | | | |
|---|---|---|---|
| 5,001,726 A | 3/1991 | Kawai et al. | |
| 5,333,147 A | 7/1994 | Nohara et al. | |
| 6,604,221 B1* | 8/2003 | Ueno | 714/771 |
| 6,728,311 B1 | 4/2004 | Waschura et al. | |
| 7,190,752 B2 | 3/2007 | Shake et al. | |
| 2003/0048840 A1 | 3/2003 | Ling et al. | |
| 2003/0177438 A1 | 9/2003 | Waschura et al. | |
| 2010/0054323 A1 | 3/2010 | Farjad-rad | |
| 2010/0329322 A1 | 12/2010 | Mobin et al. | |

* cited by examiner

*Primary Examiner* — Curtis Odom
(74) *Attorney, Agent, or Firm* — WPAT, PC; Justin King

(57) ABSTRACT

A receiver circuit receives an incoming signal and accordingly provides an internal signal, and includes an equalizer, a slicer module and a counter module. The equalizer provides a signal level according to the incoming signal, the slicer module compares if the internal signal exceeds a level range; according to comparison result, the counter module provides a signal quality indication capable of indicating whether a bit error rate of signal receiving is greater than a predetermined reference bit error rate. One of an upper bound and a lower bound of the level range can equal the signal level, a distance between the upper bound and the lower bound is set according to a reference signal-to-noise ratio which associates with the reference bit error rate.

10 Claims, 6 Drawing Sheets

RECEIVER CIRCUIT

FIELD OF THE INVENTION

The present invention relates to a receiver circuit, and more particularly, to a receiver circuit capable of indicating signal quality according to relation between signal-to-noise ratio (SNR) and bit error rate (BER).

BACKGROUND OF THE INVENTION

Semiconductor chip (die, integrated circuit) is one of the most important hardware bases of modern information society. An electronic device integrates a plurality of chips; these chips mutually connect via channels, e.g., routes and/or transmission lines on circuit board, for signal exchange. By contents embedded in signal (e.g., data, message and/or command, etc), the chips in the electronic device can cooperate with each other to implement macro functions of the electronic device.

For receiving signal coming from other chip, each chip includes receiver circuit(s) to retrieve contents from received signal(s); because signal received is affected by various non-ideal factors (e.g., noise, low-pass nature of channel and interference between channels, etc), receiver circuit is demanded to evaluate quality of signal, and hence signal can be properly equalized, corrected and compensated. For example, BER is a common signal quality indication.

In a conventional signal quality evaluation solution, receiver circuit receives a test signal of predetermined patterns fed via channel, retrieves signal contents, compares if the retrieved signal matches the predetermined patterns, and accordingly evaluates BER. For example, assuming the test signal carries N bits; after receiving and retrieving of receiver circuit, if the retrieved contents contain Nx bits which fail to match the predetermined patterns, then a ratio Nx/N between the two numbers Nx and N is used as an evaluation of BER for signal receiving. In modern advanced signal interconnection standard, tolerable BER of receiver circuit is usually set to an order of $10^{\wedge}(-12)$ or $10^{\wedge}(-15)$, while bit rate of signal exchange is merely about $10^{\wedge}9$ to $10^{\wedge}10$ bits per second. Therefore, to obtain a statistically meaningful BER, such conventional art needs to spend a lot of time to feed huge amount of test bits.

Another conventional solution for evaluating quality of signal received is eye diagram monitoring. When receiver circuit receives an incoming signal and retrieves its contents, receiver circuit samples the signal in response to a normal timing, and determines whether sampled bit content is logic 0 or 1 according to a normal threshold level. To implement eye diagram monitoring, receiver circuit is arranged to further samples the received signal in response to a test timing (phase), and determines resultant bit content according to a test threshold level; if the bit content determined with a given test timing and a given test threshold level matches that determined with the normal timing and the normal threshold level, the given test timing and test threshold level are included in eye range of the eye diagram; if the two bit contents mismatch, the given test timing and test threshold level are excluded from eye range. By varying test timing and/or test threshold level, coverage of eye range can be probed and quality of signal received can be evaluated accordingly. For example, a larger coverage of eye range represents a better signal receiving quality, because it means that receiver circuit can tolerate greater timing shift and level variation.

However, since eye diagram monitoring needs to test many different combinations of testing timing and test threshold levels, such conventional art also needs a lot of time to scan the eye range. In addition, BER evaluation by eye diagram monitoring requires more information. Deriving BER from eye diagram not only needs to know threshold level variation (vertical extent) of eye range, but also needs information about signal amplitude; correct BER can be obtained only when both mentioned factors are gathered. In absence of amplitude detection, such conventional art can only be implemented by receiver circuit with AGC (auto gain control) capability, and thus can not be broadly adopted. Also, since eye diagram monitoring needs to fine-tune phase of test timing and amount of test threshold level, hardware complexity dramatically increases.

SUMMARY OF THE INVENTION

An objective of the invention is providing a receiver circuit to address issues of aforementioned prior arts. The receiver circuit of the invention is capable of receiving an incoming signal and accordingly providing an internal signal, and includes an equalizer, a data sampler, a slicer module and a counter module. The data sampler is arranged to sample the internal signal, determine sampled bit content according to a threshold level, and accordingly provide a data signal. The equalizer can implement a decision feed back equalizer (DFE), and is arranged to provide an equalizing compensation signal in response to the data signal; the internal signal can be a linear combination of the incoming signal and the equalizing compensation signal; the equalizer is further arranged to provide a signal level according to the data signal which originates from the incoming signal. The slicer module is coupled to the internal signal and the equalizer for comparing whether the internal signal exceeds a level range and accordingly providing a comparison result. The counter module is coupled to the slicer module for providing a signal quality indication according to the comparison result of the slicer module.

The aforementioned level range is between an upper bound and a lower bound, and associates with the signal level. For example, one of the upper bound and the lower bound can equal the signal level; a distance between the upper bound and the lower bound can be determined according to a reference signal-to-noise ratio and the signal level. The reference SNR associates with a reference bit error rate, so the signal quality indication can indicate whether actual BER of signal receiving is greater than the reference bit error rate. For example, the signal level can be an average level of logic 1, and the level range covers the signal level and its surround. The slicer module is arranged to sample the internal signal according to timing of content retrieved, and compare whether each sample is greater than the upper bound and/or the lower bound of the level range, so the counter module can accordingly accumulate a measured count to reflect how many samples fall in the level range. Assuming the internal signal carries N1 bits of logic 1, and the measured count reflects that there are Nr samples fall in the level range, then a ratio Nr/N1 can reflect SNR of signal received. As the number Nr is closer to the number N1, it suggests that intensity of logic 1 of the internal signal converges to the signal level more closely, and thus SNR is greater. Because of close association between SNR and BER, BER can be evaluated from SNR.

In an embodiment of the invention, the slicer module includes a first slicer and a second slicer, both coupled to the internal signal, for respectively comparing whether each sample of the internal signal is greater than the upper bound and the lower bound of the aforementioned level range, and accordingly providing a first signed result and a second signed result. The first signed result and the second signed result can be included in the comparison result of the slicer module, so the counter module can selectively accumulate the measured count according to whether the first signed result and the second signed result are identical, and provide the signal quality indication according to the measured count. For example, the first slicer can use a positive sign (e.g., logic 1) in the first signed result to represent that a sample is greater than the upper bound, and use a negative sign (e.g., logic 0) to represent that the sample is less than the upper bound; similarly, the second slicer can use a positive sign in the second signed result to represent that the sample is greater than the lower bound, and a negative sign to represent that the sample is less than the lower bound. If the first signed result and the second signed result are different (e.g., exclusive-OR operation of the first signed result and the second signed result equals logic 1), then it can be concluded that the sample falls in the level range, and the counter module therefore increments the measured count by 1; on the other hand, if the first signed result and the second signed result are identical, then the sample does not locate in the level range, and hence the counter module does not have to increment the measured count.

In another embodiment of the invention, the slicer module can include a switch circuit and a single slicer. The switch circuit is coupled to the slicer, and is arranged to conduct the upper bound of the level range as a comparison level during a first interval, and conduct the lower bound as the comparison level during a second interval; the slicer is coupled to the internal signal and arranged to compare whether samples of the internal signal are greater than the comparison level respectively during the first interval and the second interval, and accordingly provide a plurality of first signed results and a plurality of second signed results. In other words, during the first interval, the slicer is arranged to compare whether a plurality of samples of the internal signal are greater than the upper bound and accordingly provide the plurality of first signed results; during the second interval, the slicer is arranged to compare whether another plurality of samples of the internal signal are greater than the lower bound, and accordingly provide the plurality of second signed results. The counter module is arranged to provide the measured count according to the plurality of first signed results and second signed results.

Working with the slicer module of single slicer, an embodiment of the counter module can include a first counter and a second counter; during the first interval, the first counter is arranged to selectively increment a first count according to the first signed results; during the second interval, the second counter is arranged to selectively increment a second count according to the second signed results, and the counter module is arranged to provide the measured count according to a difference between the first count and the second count. For example, during the first interval, if the slicer compares to find a sample of the internal signal is greater than the upper bound, the first counter can increment the first count by 1; otherwise, if the sample is less than the upper bound, the first counter does not need to increment the first count. Similarly, during the second interval, if the slicer compares to find a sample of the internal signal is greater than the lower bound, the second count can increment the second count by 1; on the contrary, if the sample is less than the lower bound, the second counter does not have to increment the second count. After the first interval and the second interval, subtracting the first count from the second count can lead to the measured count to reflect how many samples fall in the level range.

Working with the slicer module of single slicer, another embodiment of the counter module can include a single counter which is controllable to count up and count down; during the first interval, the counter is arranged to selectively increment the measure count according to the first signed results; during the second interval, the counter is arranged to selectively decrement the measured count according to the second signed results.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
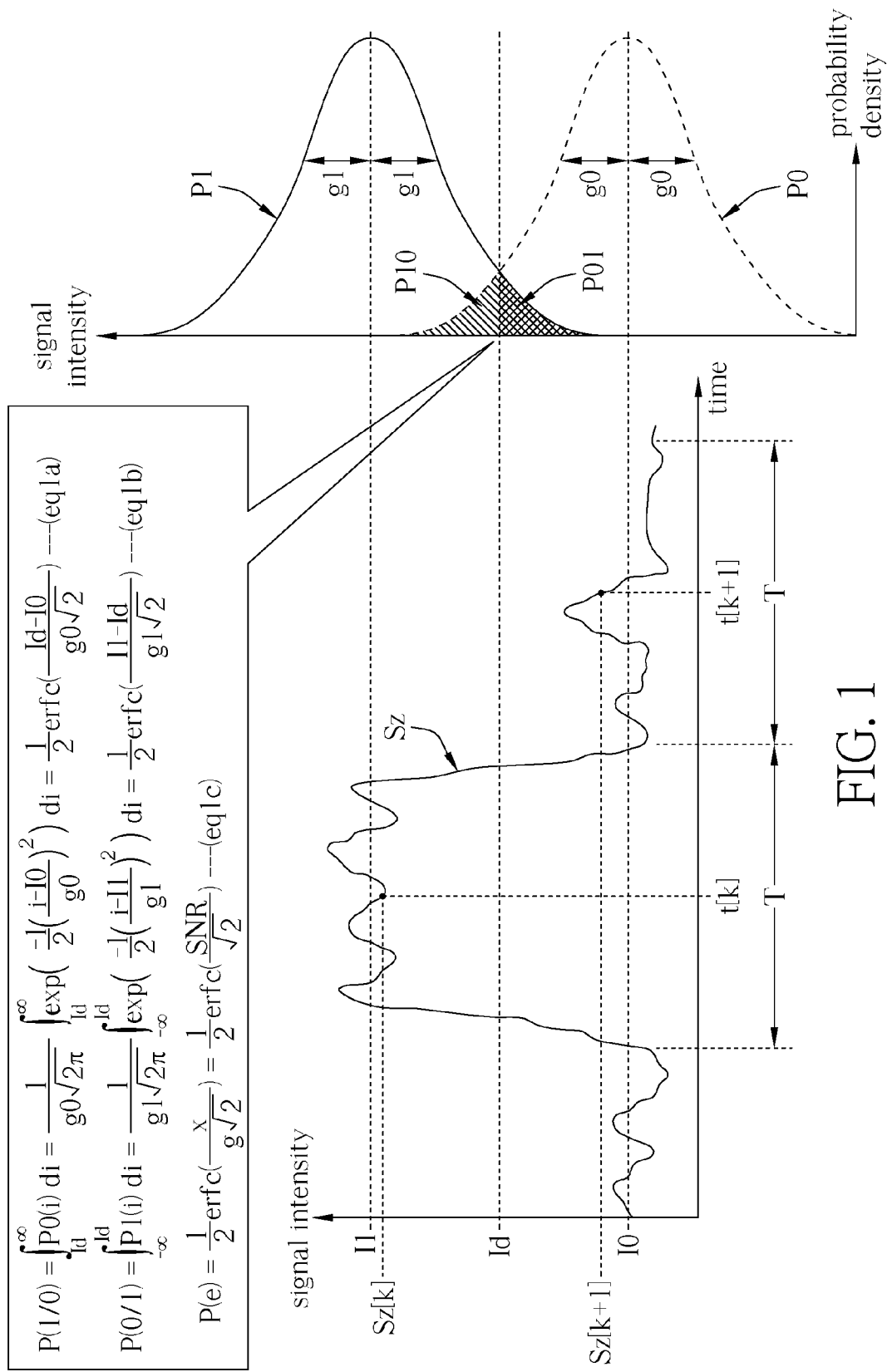
FIG. 1 illustrates sampling a signal and determining its digital contents.

Please refer to FIG. 1 which illustrates sampling a signal Sz and determining bits carried by the signal, e.g., bits coded by NRZ (Non-Return-to-Zero). In the signal Sz, each bit lasts a period T. Sampling the signal Sz at time t[k] obtains a sample Sz[k]; after a period T, sampling at next time t[k+1] can obtain another sample Sz[k+1]. The samples Sz[.] obtained from the signal Sz can be compared to a level Id to determine logic value of each sample Sz[.]; that is, the level Id is a threshold level for data slicing. As shown in FIG. 1, because the sample Sz[k] is greater than the level Id, it is recognized as a bit of logic 1; on the other hand, the sample Sz[k+1] is less than the level Id, so the sample Sz[k+1] is determined to be logic 0.

Owing to non-ideal factors, signal intensity of the signal Sz is stochastic, so values of its samples are stochastic. As shown in FIG. 1, when the signal Sz carries logic 1, probability density of its sampled value can be represented by a distribution P1, which features a standard deviation g1 and a mean equal to level I1. On the other hand, when the signal Sz carries logic 0, probability density of its signal intensity can be represented by another distribution P0, which features a standard deviation g0 and an average at level I0. For example, the distributions P1 and P0 can be normal distributions (Gaussian distributions).

When the signal Sz carries logic 0, if a sample is greater than the level Id, then this sample will be incorrectly determined to be logic 1, and therefore causes a bit error; because probability for a sample to be greater than the level Id equals an area P10 where the distribution P0 extends above the level Id, a probability P(1/0) for mistaking logic 0 for logic 1 can be calculated by equation eq1a, wherein erfc(.) is a complementary error function. On the other hand, when the signal Sz carries logic 1, if a sample is less than the level Id, then this sample will be erroneously read as logic 0 and causes bit error; since probability for a sample to be less than the level Id equals an area P01 where the distribution P1 extends below the level Id, a probability P(0/1) for mistaking logic 1 for logic 0 can be evaluated by equation eq1b. Combining the equations eq1a and eq1b, bit error rate P(e) for bit error to happen when reading the signal Sz can be evaluated by equation eq1c; as the equation eq1c shows, bit error rate P(e) associates with SNR of the signal Sz. In the equations eq1a and eq1b, differences (Id−I0) and (I1−Id) relate to signal magnitude (amplitude of swing), the standard deviations g0 and g1 reflect effect of noise, hence (Id−I0)/g0 and (I1−Id)/g1 associate with SNR of the signal Sz, and lead to the equation eq1c.

Figure 2:
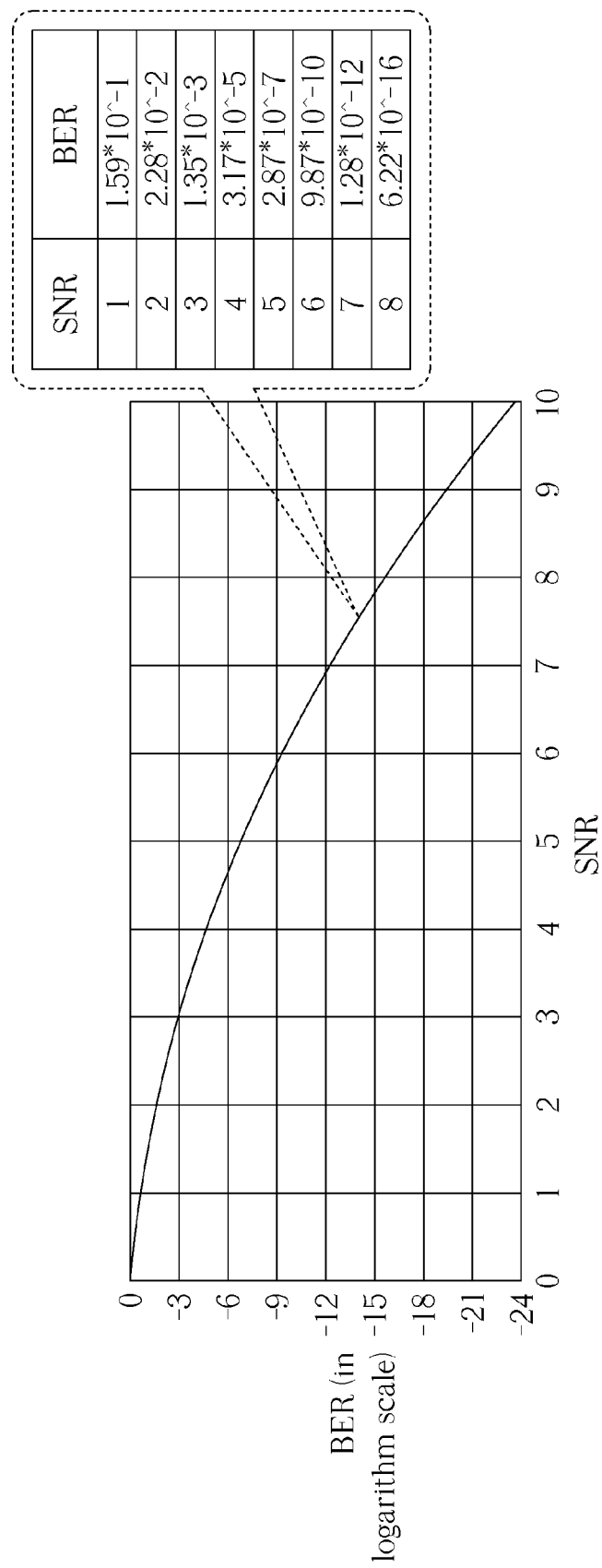
FIG. 2 illustrates relationship between SNR and BER.

According to the equation eq1c, relation between BER and SNR can be illustrated in FIG. 2; SNR and BER are of negative correlation, as SNR is greater, BER becomes less. For example, as shown in FIG. 2, if SNR equals 2, BER is about 2.28%; if SNR increases to 3, BER drops to approximate 0.135%. Please also refer to FIG. 3 illustrating relation between signal fluctuation and probability density of signal intensity; when the signal Sz (FIG. 2) carries logic 1, if probability density of signal intensity follows a curve P1a featuring a less standard deviation g1a, then waveform of the signal Sz would look like waveform S1a, which suffers less fluctuation, converges around the averaged level I1 longer, and is of higher SNR and lower BER; on the contrary, if probability density of sampled value follows a curve P1b with a greater standard deviation g1b, then waveform of the signal Sz would look like waveform S1b, which suffers greater disturbance and lower SNR, often drifts away from the level I1 to be incorrectly interpreted as logic 0, and therefore causes greater BER.

Figure 3:
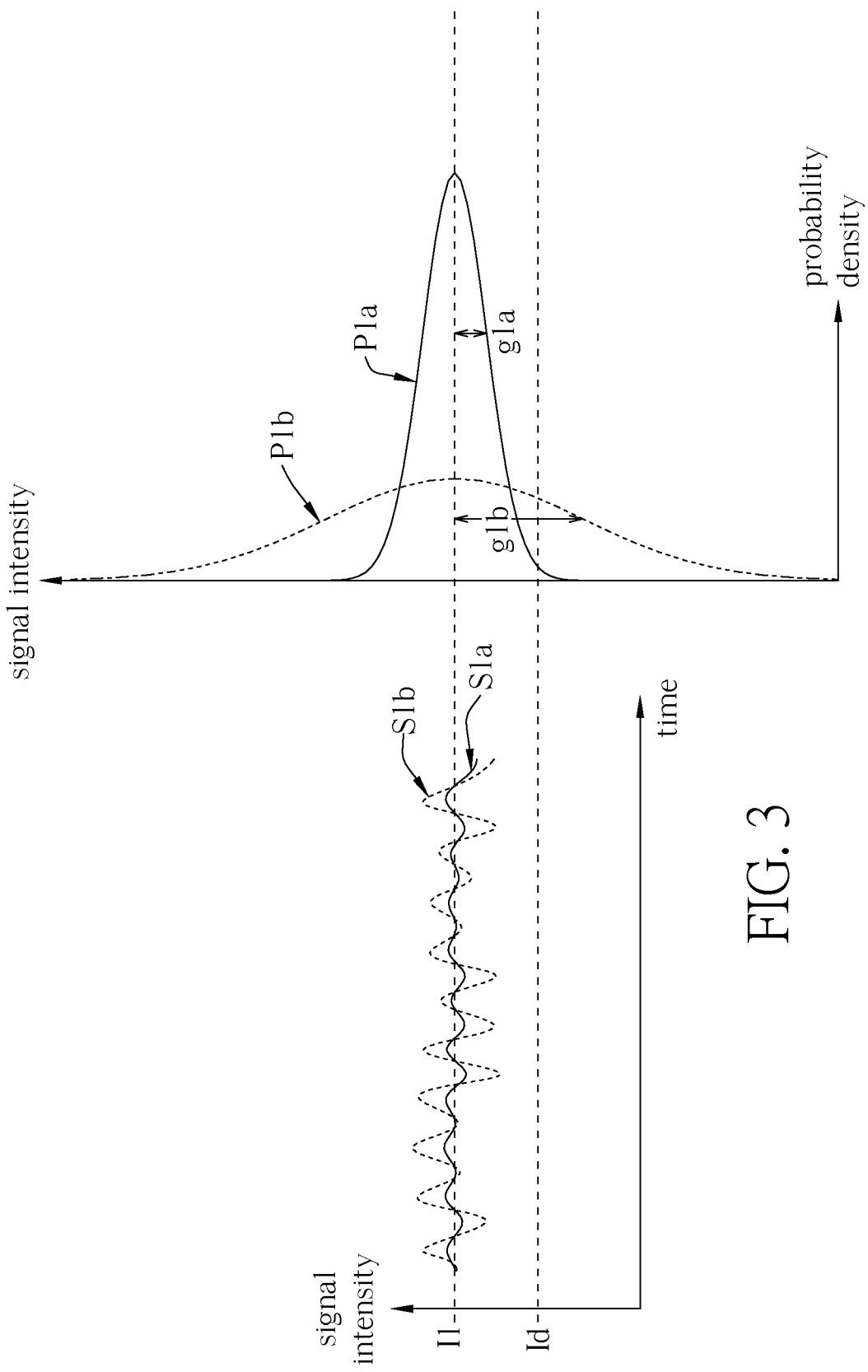
FIG. 3 illustrates relationship between SNR and fluctuation of signal waveform.

Based on discussion of FIG. 1 to FIG. 3, it is understood that, if SNR of the signal Sz can be estimated, BER can then be derived from SNR. To estimate SNR/BER of the signal Sz, a local level range can be first defined around the level I1, then number of samples which fall inside the level range can be counted; assuming the signal Sz originally has N1 bits of logic 1, and Nr samples are found to fall inside the level range, then a ratio Nr/N1 can reflect how often the signal Sz drifts away from the level I1, and hence lead to BER of the signal Sz. For example, an upper bound and a lower bound of the level range can respectively equal I1 and (I1−D), where D is a distance between the upper bound and the lower bound, and can be regarded as extent of signal fluctuation; hence, a ratio I1/D can be regarded as a reference signal-to-noise ratio SNR0. >From FIG. 1, it is understood that when SNR equals the reference signal-to-noise ratio SNR0, then a theoretical probability for samples to fall inside the level range can be calculated according to the equations eq1a and eq1c, and is referred to as a reference probability.

For example, if the distance D is set to I1/4, then the reference signal-to-noise ratio SNR0 is 4, the distance D equals one standard deviation for probability density of SNR=4, and the reference probability is about 0.34; that is, if actual SNR of the signal Sz equals 4, then the ratio Nr/N1 will approach the reference probability 0.34. If the ratio Nr/N1 obtained by actually counting samples of the signal Sz is greater than the reference probability, then the actual SNR of the signal Sz will be greater than the reference signal-to-noise ratio SNR0, because the signal Sz has more samples falling inside the level range. On the contrary, if measured ratio Nr/N1 is less than the theoretical reference probability, it is recognized that the actual SNR of the signal Sz is less than the reference signal-to-noise ratio SNR0.

Similarly, the distance D can also be set to I1/8; while the reference probability remains 0.34, the reference signal-to-noise ratio SNR0 is equivalently set to 8, because the distance D matches a stand deviation when SNR=8. As the number Nr is obtained by counting samples falling into the level range confined by the distance D=I1/8, if the ratio Nr/N1 is still greater than the reference probability 0.34, then the actual SNR of the signal Sz is greater than 8. Contrarily, if the actually measured ratio Nr/N1 is less than the reference probability 0.34, then SNR of the signal Sz is less than the reference signal-to-noise ratio (which equals 8).

Briefly speaking, by accumulating the number Nr of samples falling within the level range set by the distance D, and comparing if the ratio Nr/N1 is greater than the reference probability, whether SNR is greater than the reference signal-to-noise ratio SNR0 can be revealed, because the distance D, the reference probability and the reference signal-to-noise ratio SNR0 are mutually correlated. For example, if the reference probability is 0.34, then the distance D can equal a ratio between the level I1 and the reference signal-to-noise ratio SNR0, that is, D=I1/SNR0. According to FIG. 2, after SNR is obtained, signal BER can be obtained. For example, a reference bit error rate can be calculated from the reference signal-to-noise ratio SNR0; if the actual SNR is greater than the reference signal-to-noise ratio SNR0, then the actual BER will be less than the reference bit error rate.

Figure 4:
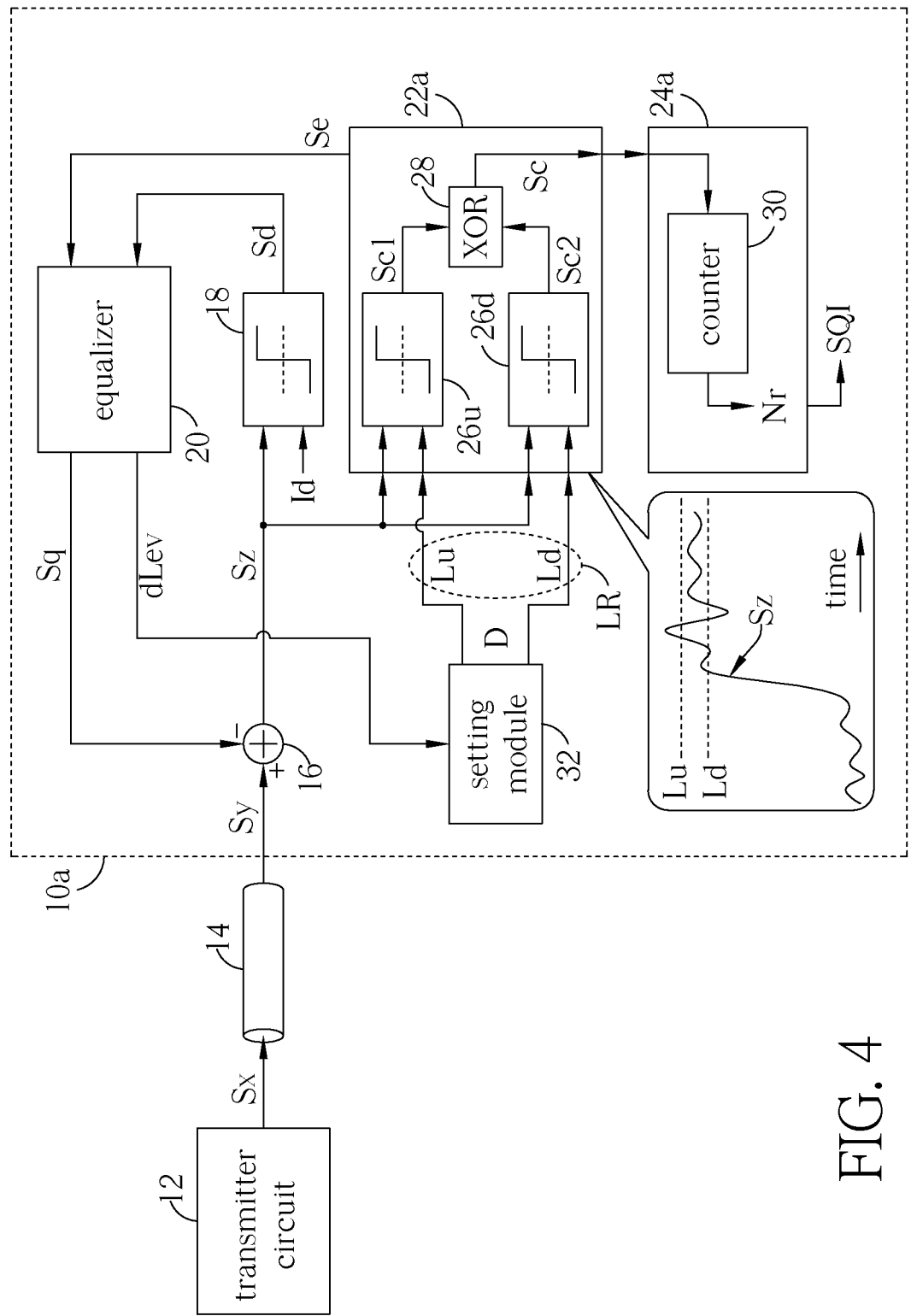
FIG. 4 to FIG. 6 illustrate receiver circuits according to embodiments of the invention.

Please refer to FIG. 4 illustrating a receiver circuit 10a according to an embodiment of the invention. The receiver circuit 10a is coupled to a transmitter circuit 12 via a channel 14, so a signal Sx sent by the transmitter circuit 12 can be transmitted to the receiver circuit 10a via the channel 14 to be received as a signal Sy (an incoming signal). The receiver circuit 10a includes an arithmetic node 16, a sampler 18, an equalizer 20, a setting module 32, a slicer module 22a and a counter module 24a. The arithmetic node 16 is coupled between the channel 14, the equalizer 20 and the sampler 18, for linearly combining the signal Sy and a signal Sq to form a signal Sz as an internal signal. The sampler 18 is a data sampler coupled between the arithmetic node 16 and the equalizer 20, for sampling the signal Sz, determining bit content of each sample according to a threshold level Id, and accordingly providing a signal Sd as a data signal. For example, at a time t[k], the sampler 18 obtains a sample Sz[k] from the signal Sz; if the sample Sz[k] is greater than the level Id, then the sampler 18 outputs a bit Sd[k] of logic 1 to the signal Sd; if the sample Sz[k] is less than the level Id, the sampler 18 provides a bit Sd[k] of logic 0 to the signal Sd. Hence, each bit Sd[.] of the signal Sd is a bit retrieved from the signal Sy by the receiver circuit 10a. The signal Sd can be transmitted to a de-serializer (not shown) to be converted to a plurality of parallel signals, and/or, be transmitted to a clock-data recovery circuit (not shown) for retrieving a data clock (not shown), so the sampler 18 can sample each bit Sd[.] from the signal Sd in response to the data clock.

The equalizer 20 can implement a decision feedback equalizer, and is coupled between the sampler 18 and the arithmetic node 16, for providing the signal Sq, as an equalizing compensation signal, according to the signal Sd and a signal Se, so the arithmetic node 16 can combine the signals Sq and Sy to form the signal Sz; in addition, according to the signal Sd originated from the signal Sy, the equalizer 20 is also arranged to provide a level dLev as a signal level. For example, the level dLev can be the level I1 representing an average level of logic 1, as shown in FIG. 1.

In an embodiment of the invention, the receiver circuit 10a can operate in a normal receiving mode and a signal quality estimation mode. In the normal receiving mode, the equalizer 20 can dynamically adjust the level dLev in response to the signals Sy and Sd, so the level dLev can be written as dLev[n]. For example, the sample Sz[k] can equal a result of subtracting a sample Sq[k] of the signal Sq from a sample Sy[k] of the signal Sy, and the sample Sq[k] can equal a weighted sum of the bits Sd[k−1], Sd[k−2], . . . to Sd[k−Neq]. According to positive/negative sign of subtracting dLev[n]*Sd[k] from the sample Sz[k], a sample e[k] (not shown) can be provided, i.e., e[k]=sign(Sz[k]−dLev[n]*Sd[k]). Then, a following level dLev[n+1] can be calculated according to a preceding level dLev[n−1] and a plurality of preceding samples e[.]. On the other hand, when the receiver circuit 10a operates in the signal quality estimation mode, the equalizer 20 can freeze the level dLev to keep its value fixed; in addition, the setting module 32, the slicer module 22a and the counter module 24a will cooperate to provide a signal SQI for reflecting quality of signal receiving.

The setting module 32 is coupled between the equalizer 20 and the slicer module 22a, for providing, according to the level dLev, two levels Lu and Ld respectively as an upper bound and a lower bound of a level range LR, while the levels Lu and Ld are different by a distance D. For example, in an embodiment, the levels Lu and Ld can equal the levels dLev and (dLev−D), respectively. In another embodiment, the levels Lu and Ld can be respectively set to the levels (dLev+D) and dLev.

The slicer module 22a includes two slicers 26u and 26d, and a logic gate 28. The slicers 26u and 26d are both coupled to the signal Sz. The slicer 26u is arranged to compare if each sample Sz[.] of the signal Sz is greater than the level Lu (the upper bound of the level range LR), and accordingly provide a signal Sc1 to reflect a signed comparison result. For example, the slicer 26u can use a positive sign (e.g., logic 1) in the signal Sc1 to reflect that a sample Sz[k] is greater than the level Lu, and output a negative sign (e.g., logic 0) to the signal Sc1 to reflect that the sample Sz[k] is less than the level Lu. Similarly, the slicer 26d is arranged to compare if each sample Sz[.] of the signal Sz is greater than the level Ld (the lower bound of the level range LR), and accordingly provide a signal Sc2 to reflect a signed comparison result. For example, the slicer 26d can provide logic 1 to the signal Sc2 to reflect that the sample Sz[k] is greater than the level Ld, and output a logic 0 to the signal Sc2 to reflect that the sample Sz[k] is less than the level Ld. The logic gate 28 is coupled to the two slicers 26u and 26d, for providing a signal Sc as a comparison result in response to a logic operation (e.g., exclusive-OR) result of the signals Sc1 and Sc2. In addition, the slicer module 22a also provides the signal Se according to one of the signals Sc1 and Sc2. For example, if the level Lu (the upper bound) equals the level dLev, then the signal Se can be the signal Sc1 of the slicer 26u; on the other hand, if the level Ld (the lower bound) is set equal to the level dLev, then the signal Se can be the signal Sc2 of the slicer 26d.

The counter module 24a is coupled to the signal Sc of the slicer module 22a, and can include a single counter 30. With operation of the logic gate 28, the counter 30 in the counter module 24a can selectively accumulate a measured count, a number Nr, in response to whether the signals Sc1 and Sc2 match; according to the number Nr, the counter module 24a can provide the signal SQI for signal quality indication. For example, when the slicers 26u and 26d compare a same sample Sz[k] respectively with the levels Lu and Ld, if the signed results of the signals Sc1 and Sc2 do not match (e.g., exclusive-OR operation of the signals Sc1 and Sc2 results in a logic 1), then it is understood that the sample Sz[k] is inside the level range LR, so the counter 30 can increment the number Nr by 1; on the contrary, if corresponding signs of the signal Sc1 and Sc2 do match, then the sample Sz[k] does not fall inside the level range LR, and the counter 30 does not need to increment the number Nr.

When the receiver circuit 10a operates in the signal quality estimation mode, cooperation of the setting module 32, the slicer module 22a and the counter module 24a for reflecting signal receiving quality can be described as follows. The receiver circuit 10a can receive the signal Sy for a duration and hence the signal Sz is generated; the setting module 32 sets the upper and lower bounds of the level range LR according to the level dLev of fixed value, and the slicer module 22a compares if each sample Sz[.] of the signal Sz is inside the level range LR, so the counter module 24a can accumulate the number Nr in response to the comparison results. If the duration of the signal Sy should include N1 bits of logic 1, and the counter module 24a accumulates to show that there are Nr samples Sz[.] falling inside the level range LR, then the ratio Nr/N1 can reflect SNR and BER of signal receiving. As discussed via FIG. 1 to FIG. 3, if the ratio Nr/N1 is greater than the reference probability, SNR of signal receiving is greater than the reference signal-to-noise ratio SNR0, and BER is lower than the reference bit error rate associated with the reference signal-to-noise ratio SNR0. For example, assuming the duration of the signal Sz includes 50000 bits, half of them are of logic 1, so the number N1 equals 25000; if the accumulated number Nr is greater than 25000*0.34=8500 when the distance D is set to dLev/4, then SNR of signal receiving is greater than 4, and BER is lower than 10^(−4), because an SNR equal to 4 corresponds to a BER equal to 3.17*10^(−5).

Under the signal quality estimation mode, the setting module 32 can program the distance D to several different values; these values respectively correspond to different reference signal-to-noise ratios SNR0, so as to explore relations between the actual SNR and the several reference signal-to-noise ratios SNR0. For example, the setting module 32 can include a register (not shown) for registering a digital value of the level dLev and obtaining the distance D by bit shifting the level dLev. For instance, right shifting the level dLev by two bits can set the distance D equal to dLev/4; after accumulating the number Nr with the level range LR defined by such distance D, whether the actual SNR is greater than 4 can be found by comparing whether the number Nr is greater than 0.34*N1. Similarly, right shifting the level dLev by three bits sets the distance D equal to dLev/8; after accumulating the number Nr with the level range LR defined by such distance D, whether the actual SNR is greater than 8 can be found by comparing whether the number Nr is greater than 0.34*N1.

In an embodiment, the equalizer 20 can change parameters of equalization according to the signal SQI for improving quality of signal received. And/or, the signal SQI can be checked by the local receiver and better transmitter parameters (e.g. de-emphasis filter coefficients) are responded back to the remote side, so the transmitter circuit 12 can accordingly shape (e.g., de-emphasize) the signal Sx to improve quality of the signal Sy received by the receiver circuit 10a, and therefore upgrade signal receiving quality. For example, the receiver circuit of the invention can be adopted to implement a receiver of PCI Express; in protocol of PCI Express, the receiver can send an index LinkEvaluationFeedbackFigureMerit of 1 byte to the upper layer of the local receiver so that it can select better de-emphasis coefficients to be set by the remote transmitter, and the number Nr or other derived information of the invention can be utilized as the index.

Figure 5:
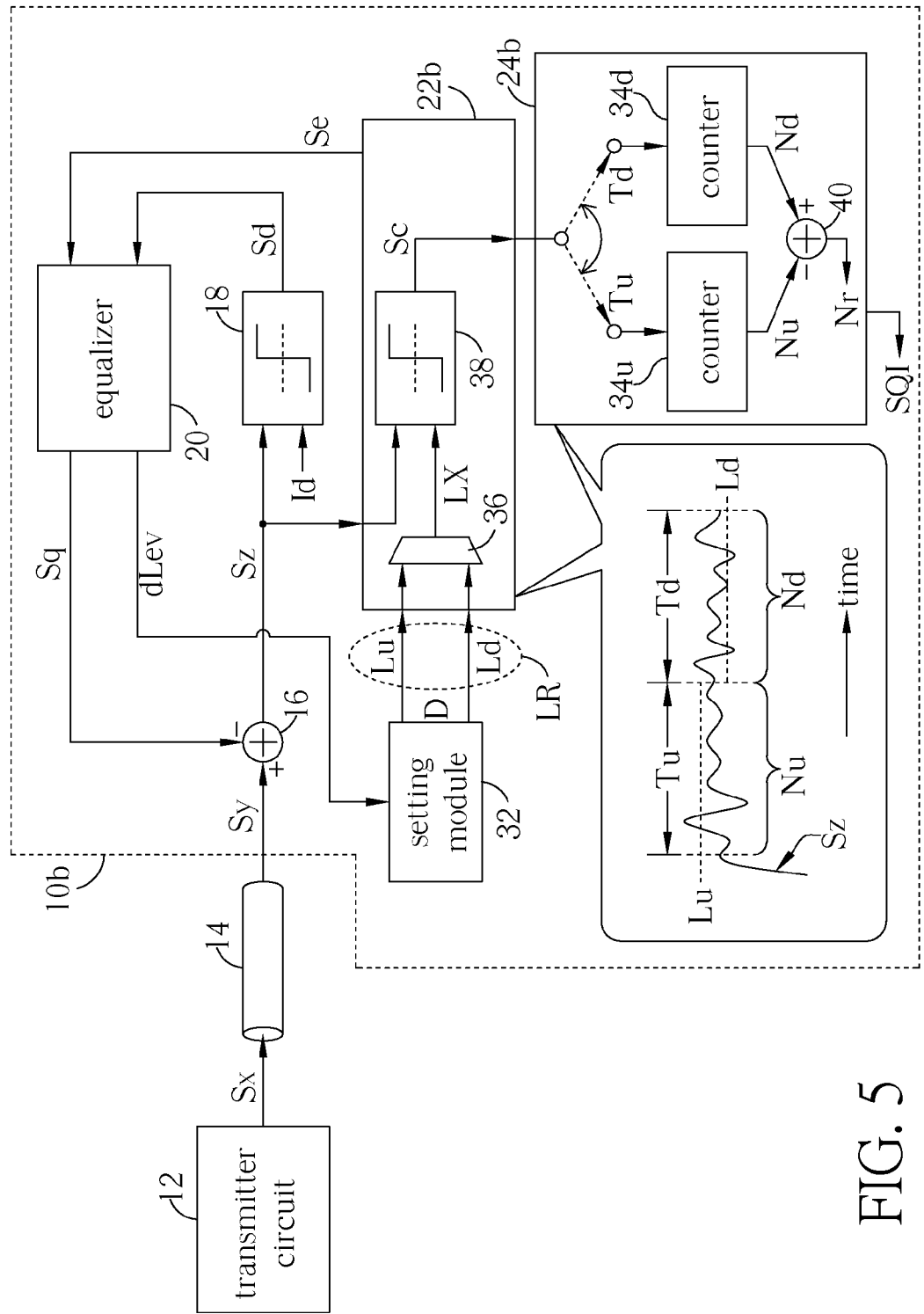

Please refer to FIG. 5 illustrating a receiver circuit 10b according to an embodiment of the invention. The receiver circuit 10b is coupled to a transmitter circuit 12 via a channel 14, so a signal Sx sent by the transmitter circuit 12 can be transmitted to the receiver circuit 10b as a signal Sy by way of the channel 14. Similar to the receiver circuit 10a in FIG. 4, the receiver circuit 10b shown in FIG. 5 also includes an arithmetic node 16, a sampler 18, an equalizer 20, a setting module 32, a slicer module 22b and a counter module 24b. The arithmetic node 16 linearly combines the signal Sy and a signal Sq to form a signal Sz. The sampler 18 is a data sampler for sampling the signal Sz and determining bit content of each sample according to a threshold level Id (also referring to FIG. 1) to form a signal Sd.

The equalizer 20 can implement a decision feed back equalizer for providing the signal Sq in response to the signal Sd and a signal Se; in addition, according to the signal Sd originated from the signal Sy, the equalizer 20 can provide a level dLev as a signal level, e.g., the level I1 representing an average level of logic 1, as shown in FIG. 1.

In an embodiment of the invention, the receiver circuit 10b is also capable of operating in a normal receiving mode and a signal quality estimation mode. During normal receiving mode, the equalizer 20 can dynamically adjust the level dLev; when the receiver circuit 10b switches to the signal quality estimation mode, the equalizer 20 can freeze the level dLev to keep its value unchanged, and the setting module 32, the slicer module 22b and the counter module 24b can cooperate to provide a signal SQI to reflect quality of signal receiving.

According to the level dLev, the setting module 32 can provide two levels Lu and Ld respectively as an upper bound and a lower bound of a level range LR, while the levels Lu and Ld are different by a distance D. For example, in an embodiment, the levels Lu and Ld can respectively equal the levels dLev and (dLev−D). In another embodiment, the levels Lu and Ld can be respectively set to the levels (dLev+D) and dLev.

As shown in FIG. 5, the slicer module 22b can include a switch circuit 36 and a single slicer 38. The switch circuit 36 is coupled between the setting module 32 and the slicer 38; for signal quality estimation, the switch circuit 36 can conduct the level Lu (the upper bound of the level range LR) as a level LX during an interval Tu, and switch to conduct the level Ld (the lower bound of the level range LR) as the level LX during another interval Td. Durations of the intervals Tu and Td should be equal, each covers a plurality of bits, i.e., a plurality of samples Sz[.] of the signal Sz. The slicer 38 is coupled to the signal Sz and the switch circuit 36; as the level LX provided by the switch circuit 36 works as a comparison level, the slicer 38 can compare whether samples Sz[.] of the signal Sz are greater than the level LX, and accordingly provide signed results to the signal Sc.

That is, by operation of the switch circuit 36, the slicer 38 compares whether a plurality of samples Sz[.] of the signal Sz are greater than the level Lu during the interval Tu when the level LX equals the level Lu; during another interval Td when the level LX equals the level Ld, the slicer 38 turns to compare whether another plurality of samples Sz[.] are greater than the level Ld.

The counter module 24b is coupled to the slicer module 22b for providing a number Nr as a measured count in response to the signed results in the signal Sc, and providing the signal SQI according to the number Nr. As shown in FIG. 5, the counter module 24b can include two counters 34u, 34d and an arithmetic node 40. The counters 34u and 34d are both coupled to the slicer module 22b. During the interval Tu, the counter 34u can selectively increment a count, i.e., a number Nu, according to signed results in the signal Sc. On the other hand, during the interval Td, the counter 34d can selectively increment another count, i.e., a number Nd, according to signed results in the signal Sc. The arithmetic node 40 is coupled to the numbers Nu and Nd, for providing the number Nr according to a difference (Nd−Nu) between the numbers Nu and Nd. Hence, the number Nr can reflect how many samples Sz[.] fall inside the level range LR.

For example, during the interval Tu, if the slicer 38 compares to find a sample Sz[k] is greater than the level Lu, then the counter 34u can increment the number Nu by 1; contrarily, if the sample Sz[k] is less than the level Lu, the counter 34u does not have to increment the number Nu. Similarly, during the interval Td, if the slicer 38 compares to find a sample Sz[k2] is greater than the level Ld, then the counter 34d can increment the number Nd by 1; contrarily, if the sample Sz[k2] is less than the level Ld, the counter 34d does not have to increment the number Nd. After the intervals Tu and Td end, the number Nr can be calculated by subtracting the number Nu from the number Nd, so as to reveal how many samples Sz[.] are inside the level range LR. For instance, temporal lengths of the intervals Tu and Td can respectively cover 50000 bits, every 50000 bits include 25000 bits equal to logic 1, so the number N1 equals 25000; the distance D can be set to dLev/4. After the intervals Tu and Td, if the number Nr=(Nd−Nu) is greater than N1*0.34, then SNR of signal receiving is greater than 4. To obtain the number Nr for a given level range LR, the interval Tu can be arranged before or after the interval Td; there can also be a plurality of intervals Tu and a plurality of intervals Td arranged alternately. In the normal receiving mode, the slicer module 22b can compare each sample Sz[.] with the level dLev to provide the signal Se.

In an embodiment of the counter module 24b, the counter module 24b can alternately send the signal Sc to the counters 34u and 34d respectively during the intervals Tu and Td; that is, the counter module 24b can conduct the signal Sc to the counter 34u instead of the counter 34d during the interval Tu, and turn to conduct the signal Sc to the counter 34d instead of the counter 34u during the interval Td. In another embodiment of the counter module 24b, the signal Sc is both conducted to the counters 34u and 34d; the counter module 24b can enable the counter 34u and disable the counter 34d during the interval Tu, so the counter 34d will not be triggered by the signal Sc to accumulate the number Nd; on the other hand, during the interval Td, the counter module 24b can switch to enable the counter 34d and disable the counter 34u.

Figure 6:
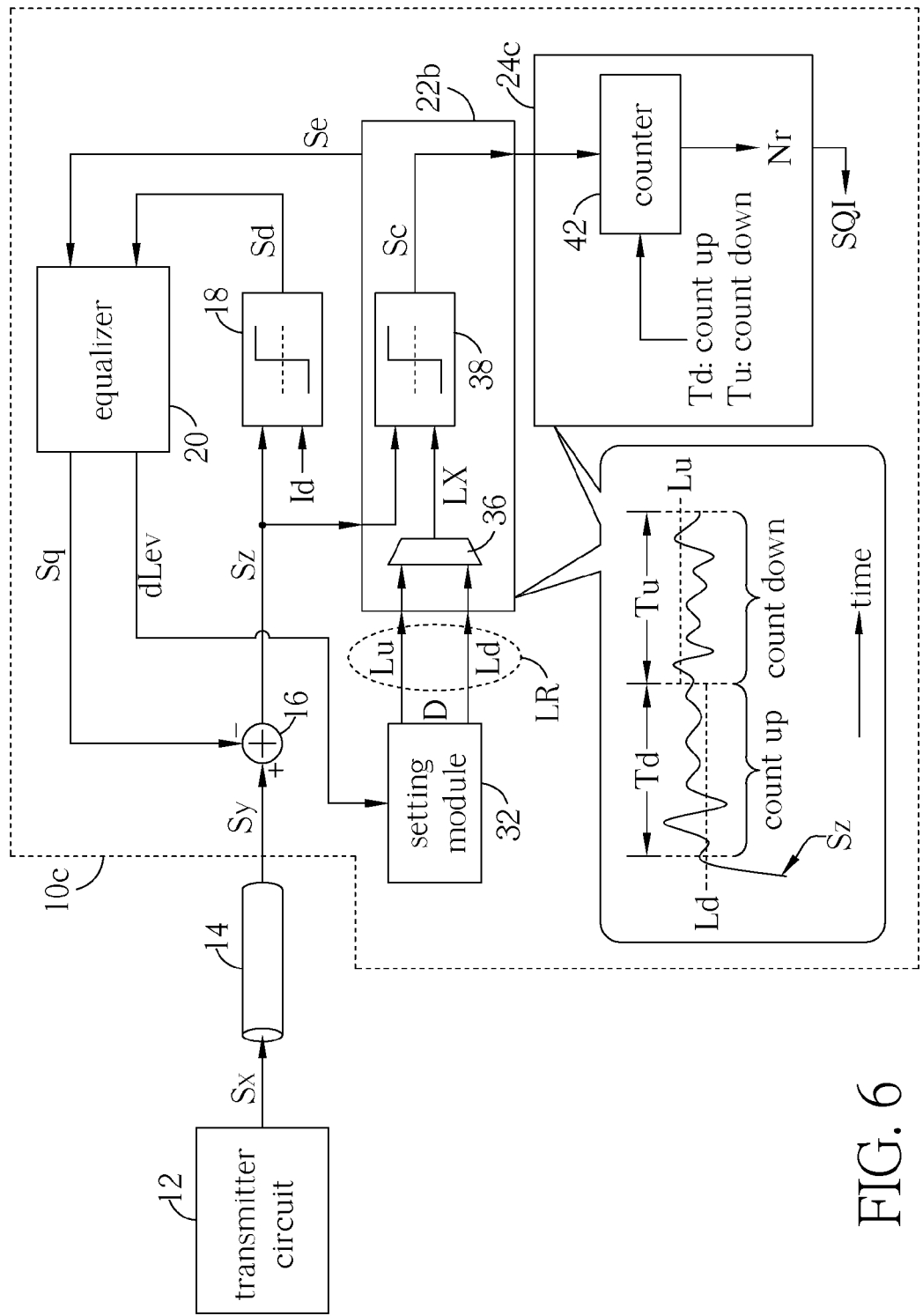

Following the embodiment of FIG. 5, please refer to FIG. 6 illustrating a receiver circuit 10c according to an embodiment of the invention. Operation of the receiver circuit 10c is similar to that of the receiver circuit 10b; the receiver circuit 10c also includes an arithmetic node 16, an equalizer 20, a sampler 18, a setting module 32 and a slicer module 22b, while a counter module 24c is adopted to replace the counter module 24b in the receiver circuit 10b. The counter module 24c can only include a single counter 24 for providing the number Nr as a measured count in response to signed results in the signal Sc. For signal quality estimation, when the slicer 38 in the slicer module 22b compares samples Sz[.] with the level Ld during the interval Td, the counter 42 can selectively increment the number Nr according to signed comparison results; for example, if a sample Sz[k1] is greater than the level Ld, then the counter 42 can increment the number Nr by 1, i.e., count up the number Nr; if the sample Sz[k1] is less than the level Ld, the counter 42 can leave the number Nr unchanged. On the other hand, during the interval Tu, when the slicer 38 compares each sample Sz[.] with the level Lu, the counter 42 can selectively decrement the number Nr according to each signed comparison result; for example, if a sample Sz[k2] is greater than the level Lu, then the counter 42 decrements the number Nr by 1, i.e., count down the number Nr; if the sample Sz[k2] is less than the level Lu, then the number Nr is kept unchanged. In this way, the number Nr can also reflect how many samples are inside the level range LR, also reveal quality of signal receiving, e.g., SNR and BER.

To sum up, according to the invention, a level range is defined around an average level of signal receiving, so quality and performance of signal receiving, such as SNR and BER, can be evaluated according to a ratio of how many samples converge inside the level range. Comparing to prior art adopting eye diagram monitoring, the invention benefits from lower hardware complexity and broader compatibility for receiver circuits without AGC, since intensity of received signal does not to be measured. Moreover, while eye diagram monitoring demands more information about vertical eye opening (eye height) and average level to derive SNR, the invention only need one information (e.g., the number Nr) to reflect signal quality, and is therefore suitable for modern signal interconnection standard, such as the single index LinkEvaluationFeedbackFigureMerit in the standard of PCI Express. Signal quality Information provided by the invention can also be integrated as a basis of adaptive transmitting/receiving enhancement algorithm. Also the invention uses shorter time to accomplish signal quality evaluation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A receiver circuit receiving an incoming signal and providing an internal signal in response, and comprising:
   an equalizer capable of providing a signal level in response to the incoming signal;
   a slicer module coupled to the internal signal and the equalizer, for comparing whether the internal signal exceeds a level range and accordingly providing a comparison result, wherein the level range is associated with the signal level; and
   a counter module coupled to the slicer module, for providing a signal quality indication according to the comparison result.

2. The receiver of claim 1, wherein the level range is between an upper bound and a lower bound, the comparison result comprises a first signed result and a second signed result, and the slicer module comprises:
   a first slicer and a second slicer coupled to the internal signal, for respectively comparing whether a sample of the internal signal is greater than the upper bound and the lower bound, and accordingly providing the first signed result and the second signed result;
   wherein the counter module is arranged to selectively accumulate a measured count according to whether the first singed result and the second signed result match, and provide the signal quality indication according to the measured count.

3. The receiver circuit of claim 1, wherein the level range is between an upper bound and a lower bound, the comparison result comprises a plurality of first signed results and a plurality of second signed results, and the slicer module comprises:
   a slicer coupled to the internal signal, and arranged to, during a first interval, compare whether a plurality of samples of the internal signal are greater than the upper bound and accordingly provide the plurality of first signed results; and arranged to, during a second interval, compare whether another plurality of samples of the internal signal are greater than the lower bound and accordingly provide the plurality of second signed results;
   wherein the counter module is arranged to provide a measured count according to the plurality of first singed results and second signed results, and provide the signal quality indication according to the measured count.

4. The receiver circuit of claim 3, wherein the counter module comprises:
   a first counter for selectively accumulating a first count according to the plurality of first signed results; and
   a second counter for selectively accumulating a second count according to the plurality of second signed results;
   wherein the counter module is arranged to provide the measured count according to a difference between the first count and the second count.

5. The receiver circuit of claim 3, wherein the counter module comprises a counter for selectively incrementing the measured count during the first interval according to the plurality of first signed results, and selectively decrementing the measured count during the second interval according to the plurality of second signed results.

6. The receiver circuit of claim 3, wherein the slicer is arranged to compare whether samples of the internal signal are greater than a comparison level to provide the plurality of first signed results and second signed results, and the slicer module further comprises:
   a switch circuit coupled to the slicer, for conducting the upper bound as the comparison level during the first interval, and conducting the lower bound as the comparison level during the second interval.

7. The receiver circuit of claim 1, wherein the level range is between an upper bound and a lower bound, and one of the upper bound and the lower bound equals the signal level.

8. The receiver circuit of claim 7, wherein a distance between the upper bound and the lower bound is determined according to a reference signal-to-noise ratio and the signal level, the reference signal-to-noise ratio is associated with a reference bit error rate, and the signal quality indication is for indicating whether a bit error rate of signal receiving of the receiver circuit is greater than the reference bit error rate.

9. The receiver circuit of claim 1 further comprising:
   a data sampler for sampling the internal signal, and accordingly provide a data signal;
   wherein the equalizer is further arranged to provide an equalizing compensation signal in response to the data signal, and the internal signal is a combination of the incoming signal and the equalizing compensation signal.

10. The receiver circuit of claim 9, wherein the equalizer is arranged to implement a decision feedback equalizer.

* * * * *